Patented June 19, 1951

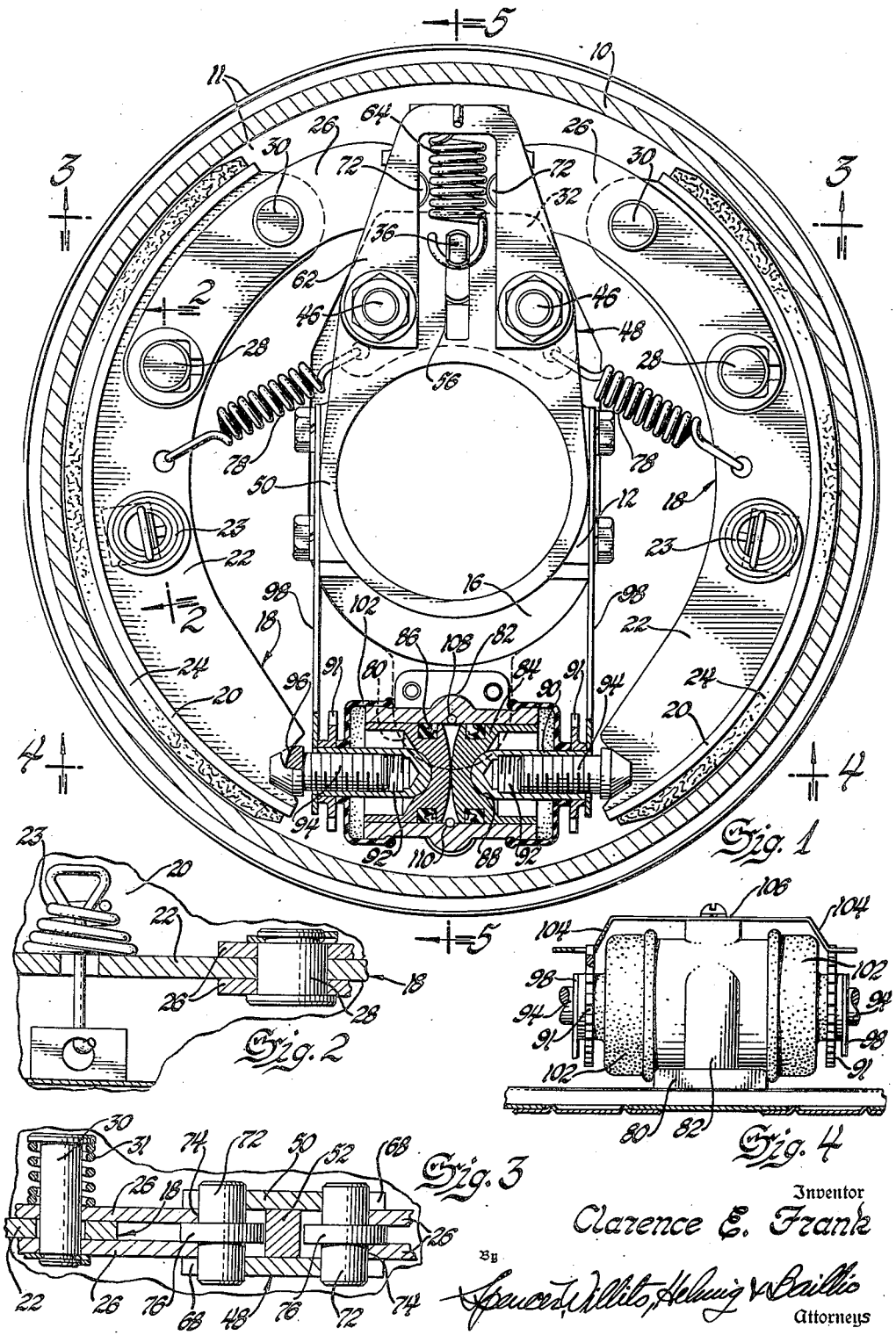

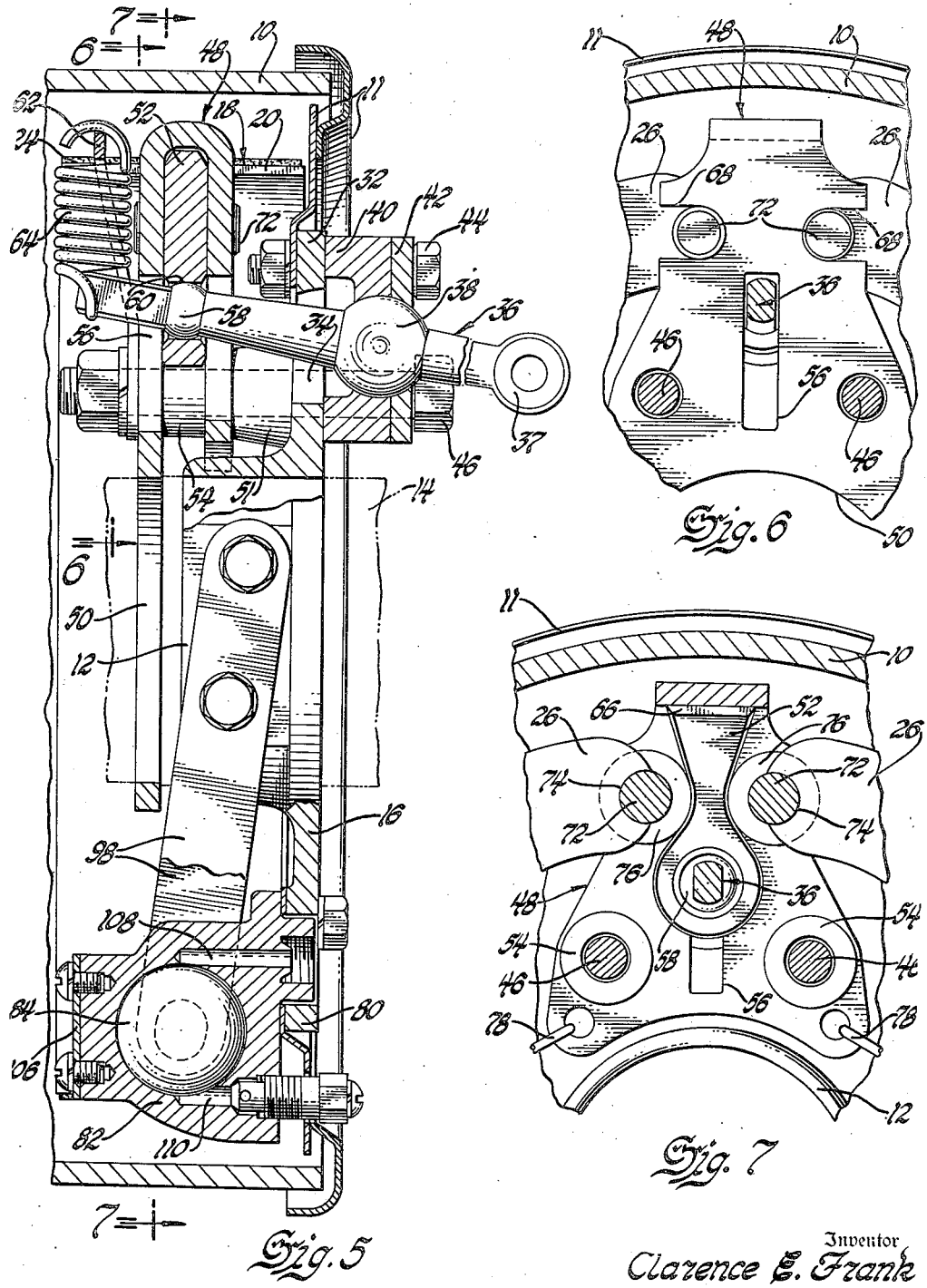

2,557,820

UNITED STATES PATENT OFFICE 2,557,820

HYDRAULIC-MECHANICAL SERVO BRAKE

Clarence E. Frank, Fraser, Mich., assignor to General Motors Corporation, Detroit, Mich., a corporation of Delaware Application February 16, 1949, Serial No. 76,756

20 Claims. (Cl. 188—106)

This invention relates to brakes and more particularly to an articulated link-type brake.

An object of the invention is to provide a hydraulic brake with the wheel cylinders acting on the ends of the shoes and the other end of the shoes pivoted to the articulated links which pivot on the mechanically operated emergency brake operating member.

Another object of the invention is to provide a hydraulic brake with a fixed wheel cylinder and free pistons centered by cantilever springs, whereby the pistons can act as a strut to transfer Servo braking effort from one shoe to the other.

Another object of the invention is to provide a hydraulically self-energized brake of the Huck type with shoes mounted on articulated links with a mechanically operated emergency brake actuation through the articulated links with the wheel pistons acting as a strut to transfer Servo braking action of one shoe to the other shoe.

Another object of the invention is to provide a brake with an emergency actuating cam engaging the articulated links.

Other objects and features of the invention will be apparent in the following description and drawings of a preferred embodiment.

Figure 1 is an elevation of the brake partially in section.

Figure 2 is a partial section of Figure 1 on the line 2—2.

Figure 3 is a partial section of Figure 1 on the line 3—3.

Figure 4 is a partial section of Figure 1 on the line 4—4.

Figure 5 is a sectional view of Figure 1 on the line 5—5.

Figure 6 is a partial section of Figure 5 on the line 6—6.

Figure 7 is a partial section of Figure 5 on the line 7—7.

The brake illustrated in the drawing has a brake drum 10 which is suitably mounted on the wheel of a vehicle and enclosed at the open side by a backing plate 11. A central support member 12 is positioned on the axle housing or other fixed member 14 shown in dot-and-dash lines. The support member 12 has an annular flange 16 to which the backing plate 11 is secured and sealed.

The brake shoes 18 have a flange 20 and web 22, and are held against the backing plate 11 by spring hooks 23. A lining 24 of friction material is suitably secured to the flange 20. Each of the brake shoes 18 is supported by a pair of articulated links 26, which are secured to the brake shoe web 22 by a fixed pivot 28 and a sliding pivot 30 near the end of the shoe. A spring 31 maintains a pressure between the shoe flange and the links to maintain the links and shoe in the normal position except when subject to the brake applying load. The articulated links support the brake shoes during hydraulic actuation of the brakes and connect the brakes to the mechanical actuation mechanism.

The brake shoe anchoring means is supported on an ear 32 extending from the flange 16. The ear has an aperture 34 for the emergency brake operating lever 36 which has a suitable means at one end, such as eye 37 for pivotal movement in the socket 40. The brake is preferably mounted on the vehicle rear axle with the lever 36 at the front, the wheel cylinder 82 at the rear. Then the eye 37 may be directly connected to the brake rod or cable and the conventional forward movement of the rod will actuate the brake. The cap plate 42 holds the ball 38 in the socket for universal pivotal movement. These parts may be secured and supported at the top by suitable means, such as bolts 44, which extend through the cap plate socket, ear 32 and backing plate 11. As shown in Figure 5, the backing plate is cut out above the aperture 34. The same parts, except backing plate 11, are secured by bolts 46, which extend inwardly to support the combined cam guide and anchor element 48.

The cam guide and anchor element 48 has a general U shape, with one leg of the U extending in the shape of a ring 50 surrounding the axial housing 14 to locate the guide, and the other or inner leg resting on a pair of bosses 51 extending from the flange 16 and through which bolts 46 extend. A cam 52 is slidably mounted between the legs of the U-shaped guide 48, which are maintained in spaced relation by the collars 54 on bolts 46. The lever 36 passes through slots 56 preferably radially located in the legs of guide 48, and has a small rounded portion 58 engaging the inside of aperture 60 in the cam 52. A bracket 62 of inverted U shape is suitably apertured at the end of the legs to be supported on the bolts 46, and provides an anchorage for spring 64 by having a slot or aperture at the base. The spring depends downwardly between the legs of bracket 62 and is attached to the end of the lever 36.

As best shown in Figure 7, the cam 52 has a wedge shape, with the largest end portion 66 of the wedge nearest the drum 10 and abutting the base portion of the U-shaped bracked 48. The other end of the cam 52 is suitably enlarged to provide sufficient material for the anchorage and yet clear the collars 54. On each side of the bracket 48 a pair of slots 68, one on each side of each leg of the bracket, provide a guide for the anchorage pins 72 for the articulated links 26. The slots are preferably located at right angles to the radius midway between the slots on which the centerline of slot 56 is located. The ends of the links 26 have a concave recess 74 to fit the anchorage pin 72. As shown in Figure 3, each pair of the links 26 are in sliding contact with the inside surface of the legs of the bracket 48. A roller 76 is suitably apertured to fit on pin 72 and has a width to fit with suitable clearance between each pair of the links 26. Each side of the lower end of the inner leg of the bracket 48 is suitably apertured to anchor brake retraction springs 78, which are attached at the other end to the shoes.

Another ear 80 extends from flange 16 opposite the ear 32 to provide a support for the wheel cylinder 82, which is shown secured thereto by suitable bolts. In the smooth continuous bore of the cylinder two hollow pistons with rounded heads are located in opposed relation. A recess near the head of the pistons provides a seat for the rubber sealing ring 86 which has a C-shaped cross section. The base of the hollow portion of the piston has a central spherical recess 88, which provides a seat for the spherical end of adjusting strut 90. The adjusting wheel 91 which has a serrated periphery is secured to the other end of the adjusting strut. The central threaded bore 92 of the adjusting strut receives the threaded bolt 94 which has a head with a slot 96 having a convex or spherical base. The end of the brake shoe flange 22 has a similar concave or spherical portion so that the shoe may pivot on the end of the adjusting bolt 94. A pair of leaf springs 98, one mounted on each side of the central support, return the pistons to their central position. The free end of each spring 98 is apertured to receive a bolt 94 and to abut against the end of the strut 90.

A rubber boot 102 provides a dirt seal for the rear side of each piston. The adjusting wheels are maintained in the adjusted position by the spring arms 104 extending from plate 106, which is suitably secured to the wheel cylinder. The passage 108 is provided for the conduit to the master cylinder (not shown), while the passage 110 is the air bleed.

These brakes are applied hydraulically in the same way as the Huck brake. The hydraulic fluid expands the pistons 84, which force each brake shoe 18 toward the anchorage. Since the links 26 are articulated to the shoes by the fixed pivot 28 and sliding pivot 30, and are pivoted to the anchorage by pins 72, the shoe will pivot to assume proper concentricity with the drum and to provide a high degree of self-energization. During braking the link 26 will pivot or rotate about pin 72 and the end having the pivot 28 to the brake shoe will move outwardly toward the drum. The central portion of the link at sliding pivot 30 will move inwardly with respect to the brake shoe. The springs 78 maintain the articulated ends of the brake shoe and the pins 72 in the slots 68. The wheel cylinders 84 are returned to their central position by the leaf springs 98.

The emergency brakes are mechanically applied by a rod or cable (not shown) which is connected to the eye 37 of lever 36. The lever is pivoted about ball 38 to extend spring 64 and to move the cam 52 toward the center of the brake. The inclined surfaces of the cam contact the rollers 76 and move the pins 72 outwardly in the slots 68. The pins engage the concave ends of the links 26 to push the links outwardly to move the shoes into initial contact with the brake drum. When the shoes contact the drum the frictional resistance between the drum and shoes will rotate the shoes with the drum. When the vehicle is moving in the normal direction the primary shoe will be rotated away from the anchor and the secondary shoe toward the anchor. The pistons 84 and cylinder 82 in this structure have no stops or abutments and thus can engage each other at the center of the cylinder to transmit force from one shoe to the other. Since the brake shoes are anchored on the floating pistons 84, when actuated for emergency braking by the cam 52, the primary shoe will be moved circumferentially by the friction with the drum, and transmit through floating pistons 84 a force on the end of the secondary shoe remote from the cam. The Servo force created by the friction between the drum and the primary shoe will increase the braking pressure on the secondary shoe. Since the shoes are mounted on articulated links, the secondary shoe will have additional pressure created by the self-energizing action. The Servo force moves the secondary shoe and link against pin 72 and forces the pin 72 against the base of slot 68 in anchor 48. This high Servo force will rotate or tilt cam 52 toward the primary shoe about ball 58. Further movement of the lever 36 will move the tilted cam to further spread the shoes by moving the pin 72 on the primary shoe side while the pin on the secondary shoe side rests against the anchor. Thus the secondary shoe will have a high degree of Servo action and self-energization. When the direction of rotation of the drum is reversed the primary and secondary shoes will be reversed. After an emergency brake application the leaf springs 98 will return the wheel pistons 84 to their retracted central position and the springs 78 will retract the articulated links and pins 72 into the base of slots 68. The articulated links 26 will automatically move between the positions for mechanical and hydraulic brake actuation.

The above described specific embodiment of the invention is capable of modification without departing from the scope thereof as defined in the appended claims.

I claim:

1. In a brake, a support, a pair of brake shoes, means between one pair of ends of said brake shoes to hydraulically apply a braking force to said shoes and to mechanically transmit braking force from one shoe to the other when the hydraulic application force is released, and means between the other pair of ends of said brake shoes to mechanically apply a braking force to the shoes and to provide an anchor for said shoes.

2. In a brake, a support, a pair of brake shoes, means between one pair of ends of said brake shoes to hydraulically apply a braking force to said shoes and to mechanically transmit braking force from one shoe to the other when the hydraulic application force is released, and means between the other pair of ends of said brake shoes to provide a sliding support for said shoes and means to mechanically expand said shoes.

3. In a brake, a support, a pair of brake shoes, means between one pair of ends of said brake shoes to hydraulically apply a braking force to said shoes and to mechanically transmit braking force from one shoe to the other when the hydraulic application force is released, an anchor having a pair of opposed slots, pins in said slots, means on the other end of said shoes engaging said pins, a cam slidably mounted in said anchor and engaging said pins to expand said shoes.

4. In a brake, a support, a pair of brake shoes, means between one pair of ends of said brake shoes to hydraulically apply a braking force to said shoes and to mechanically transmit braking force from one shoe to the other when the hydraulic application force is released, an articulated link connected to the other end of each of said shoes, an anchor providing a sliding abutment for said links, means to expand said links to apply the brakes.

5. In a brake, a support, a pair of brake shoes, means between one pair of ends of said brake shoes to hydraulically apply a braking force to said shoes and to mechanically transmit braking force from one shoe to the other, an articulated link connected to the other end of each of said shoes, said connections comprising a fixed pivot at the end of the link and a sliding pivot spaced from the end of the link, an anchor having a pair of slits therein, a pin in each slot engaging the free end of a link, and a cam to move said pins to expand said brake shoes.

6. In a brake, a support, a pair of brake shoes, a cylinder mounted on said support between one pair of ends of said shoes, a pair of pistons in opposed relation and each piston engaging a shoe, said pistons being slidable in said cylinder in opposite directions by fluid to hydraulically actuate said brakes and in the same direction by one brake shoe for Servo-brake actuation of the other shoe during mechanical braking, an anchor on said support, means slidably pivoting the other pair of ends of said shoes to said anchor during hydraulic brake actuation, and means expanding said shoes to mechanically actuate said brakes.

7. In a brake, a support, a pair of brake shoes, a cylinder mounted on said support between one pair of ends of said shoes, a pair of pistons in opposed relation and each piston engaging a shoe, said pistons being slidable in said cylinder in opposite directions by fluid to hydraulically actuate said brakes and in the same direction by one brake shoe for Servo-brake actuation of the other shoe during mechanical braking, an anchor on said support, an opposed pair of slots in said anchor, a pin in each slot, an articulated link connecting said pins and brake shoes, cam means to expand said pins and mechanically actuate said brake.

8. In a brake, a pair of brake shoes, hydraulic actuation means positioned between one end of said shoes, a link attached to the other end of each shoe by a sliding pivot at the end of the shoe and a fixed pivot spaced from the end of the shoe, an anchor having a pair of guide slots, pins mounted in said slots, the end of each link engaging a pin, cam means operating one of said pins to provide mechanical actuation of said brakes.

9. In a brake, a pair of brake shoes, a cylinder positioned between said shoes, a pair of opposed pistons in said cylinder engaging said shoes, said pistons being simultaneously slidable outwardly and toward either end of the cylinder to act as a strut to transmit the Servo-braking force from one shoe to the other, a link attached to the other end of each shoe by a sliding pivot at the end of the shoe and a fixed pivot spaced from the end of the shoe, an anchor having a pair of guide slots, pins mounted in said slots, the end of each link connected to a pin, cam means operating on said pins to provide mechanical actuation of said brake.

10. In a brake, a pair of brake shoes, hydraulic actuation means positioned between one end of said shoes, adjusting means between the hydraulic actuation means and said one end of said shoes, a link attached to the other end of each shoe by a sliding pivot at the end of the shoe and a fixed pivot spaced from the end of the shoe, an anchor having a pair of guide slots, pins mounted in said slots, the end of each link connected to a pin, cam means operating on said pins to provide mechanical actuation of said brake.

11. In a brake, a pair of brake shoes, hydraulic actuation means positioned between one end of said shoes, a link attached to the other end of each shoe by a sliding pivot at the end of the shoe and a fixed pivot spaced from the end of the shoe, cam and abutment means positioned between the ends of said links to provide a fixed abutment during hydraulic actuation of the brake and an actuating cam during mechanical actuation of the brake.

12. In a brake, a pair of brake shoes, hydraulic actuation means positioned between one end of said shoes, said hydraulic actuation means moving outwardly by fluid pressure to actuate the brakes and said hydraulic actuation means acting as a strut and moving in one direction to transmit braking force from one shoe to the other, a link attached to the other end of each shoe by a sliding pivot at the end of the shoe and a fixed pivot spaced from the end of the shoe, an anchor having a pair of guide slots, pins mounted in said slots, the end of each link connected to a pin, cam means operating between said pins to provide mechanical actuation of said brake.

13. In a brake, a pair of brake shoes, a cylinder positioned between said shoes, a pair of opposed pistons engaging said shoes, said pistons being slidable in said cylinder past the center to transmit force from one brake shoe to the other, a link attached to the other end of each shoe by a sliding pivot at the end of the shoe and a fixed pivot spaced from the end of the shoe, an anchor having a pair of guide slots, pins mounted in said slots, the end of each link connected to a pin, cam means operating between said pins to provide mechanical actuation of said brake.

14. In a brake, a support member, a U-shaped anchor secured to said support, a cam positioned between the legs of said U-shaped anchor, a pair of brake shoes, articulated links attached to a pair of opposed ends of said brake shoes, said links being slidably connected to said anchor, said cam engaging said links to mechanically actuate said shoes, and a strut between the other ends of said shoes.

15. The invention defined in claim 14, said strut consisting of two pistons, a cylinder for slidably supporting said pistons, conduit means to admit hydraulic fluid to said cylinder between said pistons to hydraulically actuate said brakes.

16. In a brake, a support plate, a pair of brake shoes, hydraulic means on the support plate positioned between said shoes at one end, an anchor on said support plate, an articulated link connecting the other end of the shoes to the anchor, cam means to spread said articulated links to apply the brakes, a portion of said hydraulic means acting as a strut to transfer servo-braking force from one shoe to the other shoe.

17. The invention defined in claim 16, and a pair of leaf springs attached to said support plate, each spring acting on a piston to center the pistons in the cylinder.

18. The invention defined in claim 16, a lever pivotally mounted on said support plate and engaging said cam.

19. In a brake, a drum, a support, a pair of brake shoes, a floating strut and actuating means movably mounted on said support between one pair of ends of said brake shoes, said means expanding said brake shoes for brake application and said means transmitting force from one brake shoe to the other by the free movement of said means relative to said support throughout the range of brake shoe movement, and means between the other pair of ends of said brake shoes to apply a braking force to said shoes and to provide an anchor fixed to said support for said shoes.

20. In a brake having hydraulic and mechanical actuation, a drum, a support, a pair of brake shoes, a floating strut and hydraulic actuating means movably mounted on said support between one pair of ends of said brake shoes, said means expanding said brake shoes for brake application during hydraulic actuation and said means transmitting force from one brake shoe to the other by the free movement of said means relative to said support throughout the range of brake shoe movement during mechanical actuation, and mechanical means between the other pair of ends of said brake shoes to apply a braking force to said shoes and to provide an anchor fixed to said support for said shoes during hydraulic actuation.

CLARENCE E. FRANK.

REFERENCES CITED

The following references are of record in the file of this patent:

UNITED STATES PATENTS

| Number | Name | Date |
| --- | --- | --- |
| 2,016,288 | Loweke | Oct. 8, 1935 |
| 2,140,379 | Carlson et al. | Dec. 13, 1938 |
| 2,188,453 | Bock | Jan. 30, 1940 |

FOREIGN PATENTS

| Number | Country | Date |
| --- | --- | --- |
| 820,719 | France | Nov. 17, 1937 |